US007712503B2

(12) United States Patent
Spotts et al.

(10) Patent No.: US 7,712,503 B2
(45) Date of Patent: May 11, 2010

(54) AUTOMATIC FLEXIBLE SPACER OR SEALANT APPLICATOR FOR A GLASS WORK PIECE AND METHOD OF APPLYING FLEXIBLE SPACER OR SEALANT TO A GLASS WORKPIECE

(75) Inventors: Richard D Spotts, Renfrew, PA (US); John M Bridgen, Zelienople, PA (US)

(73) Assignee: Billco Manufacturing Incorporated, Zelienople, PA (US)

( * ) Notice: Subject to any disclaimer, the term of this patent is extended or adjusted under 35 U.S.C. 154(b) by 864 days.

(21) Appl. No.: 11/531,047

(22) Filed: Sep. 12, 2006

(65) Prior Publication Data

US 2007/0074803 A1 Apr. 5, 2007

Related U.S. Application Data

(60) Provisional application No. 60/716,191, filed on Sep. 12, 2005.

(51) Int. Cl.
*B32B 37/00* (2006.01)

(52) U.S. Cl. ....................... 156/361; 156/107; 156/109; 156/64

(58) Field of Classification Search ................. 156/109, 156/361, 107, 64; 118/676
See application file for complete search history.

(56) References Cited

U.S. PATENT DOCUMENTS

| | | | | |
|---|---|---|---|---|
| 4,434,024 | A | | 2/1984 | Lisec |
| 4,561,929 | A | | 12/1985 | Lenhardt |
| 4,743,336 | A | | 5/1988 | White |
| 4,769,105 | A | | 9/1988 | Lisec |
| 4,885,926 | A | | 12/1989 | Lisec |
| 4,961,270 | A | | 10/1990 | Lisec |
| 4,961,816 | A | | 10/1990 | Lisec |
| 5,013,377 | A | | 5/1991 | Lafond |
| 5,045,146 | A | | 9/1991 | Rundo |
| 5,173,148 | A | | 12/1992 | Lisec |
| 5,246,331 | A | | 9/1993 | Hallahan et al. |
| 5,319,186 | A | | 6/1994 | Lenhardt |
| 5,351,451 | A | | 10/1994 | Misera et al. |
| 5,394,725 | A | | 3/1995 | Lisec |
| 5,433,818 | A | | 7/1995 | Lee |
| 5,501,013 | A | | 3/1996 | Misera et al. |
| RE035,291 | E | | 7/1996 | Lafond |
| 5,609,717 | A | * | 3/1997 | Pascale et al. ............... 156/556 |
| 5,640,828 | A | | 6/1997 | Reeves |
| 5,823,732 | A | | 10/1998 | Lisec |
| 5,888,341 | A | | 3/1999 | Lafond |
| 5,932,062 | A | | 8/1999 | Manser |
| 5,975,181 | A | | 11/1999 | Lafond |
| 6,030,475 | A | * | 2/2000 | Spotts, Jr. .................... 156/64 |
| 6,038,825 | A | | 3/2000 | Shah et al. |

(Continued)

*Primary Examiner*—Khanh Nguyen
*Assistant Examiner*—John Blades
(74) *Attorney, Agent, or Firm*—Blynn L. Shideler; Krisanne Shideler; BLK Law Group

(57) ABSTRACT

A dual head horizontal automatic flexible spacer and/or sealant applicator for a glass work piece that applies the flexible spacer and/or sealant along a single axis and will operate on a range of work pieces sizes. The machine will automatically square a work piece and pivot about a virtual pivot point of a corner of the work piece for any of a range of work piece sizes. A method of applying spacer and/or sealant is also disclosed.

10 Claims, 4 Drawing Sheets

U.S. PATENT DOCUMENTS

| | | | |
|---|---|---|---|
| 6,068,720 | A | 5/2000 | McHugh |
| 6,148,890 | A | 11/2000 | Lafond |
| 6,223,414 | B1 | 5/2001 | Hodek et al. |
| 6,279,292 | B1 | 8/2001 | Shah et al. |
| 6,329,030 | B1 | 12/2001 | Lafond |
| 6,378,586 | B1 | 4/2002 | Lafond |
| 6,470,561 | B1 | 10/2002 | Misera et al. |
| 6,494,245 | B1 * | 12/2002 | Simone ...................... 156/578 |
| 6,571,849 | B2 | 6/2003 | Erickson et al. |
| 6,609,611 | B1 | 8/2003 | Lenhardt |
| 6,634,401 | B2 | 10/2003 | Kuhn et al. |
| 6,793,758 | B2 | 9/2004 | Erickson et al. |
| 6,793,971 | B2 | 9/2004 | Trpkovski |
| 6,846,378 | B2 | 1/2005 | Kuhn et al. |

* cited by examiner

AUTOMATIC FLEXIBLE SPACER OR SEALANT APPLICATOR FOR A GLASS WORK PIECE AND METHOD OF APPLYING FLEXIBLE SPACER OR SEALANT TO A GLASS WORKPIECE

RELATED APPLICATIONS

The present application claims the benefit of U.S. Provisional Patent Application Ser. No. 60/716,191 filed Sep. 12, 2005, and entitled "AUTOMATIC FLEXIBLE SPACER OR SEALANT APPLICATOR FOR A GLASS WORK PIECE AND METHOD OF APPLYING FLEXIBLE SPACER OR SEALANT TO A GLASS WORKPIECE"

BACKGROUND OF THE INVENTION

1. Field of the Invention

The present invention relates to an automatic flexible spacer and/or sealant applicator for glass work pieces and a method of applying the same, more particularly the present invention relates to a horizontal automatic flexible spacer and/or sealant applicator for a glass work piece that applies the flexible spacer and/or sealant along a single axis, and an associated method.

2. Background Information

The fabrication of insulated glass assemblies, also known as IG, requires the application of a spacer and sealant between the multiple glass panes. The spacer is typically placed a predetermined offset from the work piece edge and is placed around the entire perimeter of the work piece. A sealant may be provided around the perimeter in the offset between the spacer and the glass work piece edge. The purpose, function and relative position of spacers and sealants is well known in IG fabrication.

One well known spacer application method for IG fabrication is manual application of the spacer. The manual application of the spacer product generally requires skilled operators for effective throughput. The operators handle the glass, possibly contaminating the IG, creating part defects. The output capacity of the manual application process largely varies depending on the skill of the operator. The skill of the operator can also vary greatly from day to day and even throughout a given shift. Combining the operator quality variance with the fact that application process is already the IG fabrication line's bottleneck, creates an inconsistent production schedule. One attempt to provide an inexpensive solution was the Accuglyde™ manual spacer applicator table sold by Billco, and generally described in U.S. Pat. No. 6,030,475, which is incorporated herein by reference. This table provided a spacer application head movable along a single track axis, wherein a mechanical linkage would rotate the glass work piece on an appropriately spaced turntable, to maintain the glass work piece in the plane of the applicator head through the work piece corners. Although this table increased the quality of each IG fabrication, it was limited to the particular size of work piece associated with the linkage, and required appropriate centering of the work piece for accurate operation. Automated spacer applicators eliminate many of these issues.

There have been automated spacer applicators that have been developed, for example, Lisec offers a fully automated vertical line to perform IG assembly using SuperSpacer™ flexible spacer product. This complete line is quite expensive and not practical for many shops. Further, GED makes spacer applicator equipment for the aluminum Intercept™ spacer. This equipment, however, requires a large labor force to support the operation. Also, Besten provides an automated line for the Truseal™ line of warm edge spacers.

One drawback to the existing automated spacer applicator solutions is the complexity of the machine increases the initial cost and the maintenance required. In these existing applications an applicator head is configured to follow the edge of a glass work piece and must be indexed around the work piece. In horizontal applications, this creates significant difficulties with where to position the stock spacer material being supplied, which typically is supplied from a long roll that is paid out. One solution is to mount the spacer supply roll above the table on the carriage, but this makes roll changes to be difficult (as a roll of spacer material can weigh over 100 lbs). An alternative known solution is for mounting the roll adjacent the table, yet this leads to a great varying length of spacer material and associated complex pay out and tensioning rolls to lead from the supply roll to the distant carriage, and increases complexity and spacer losses with the end of each roll.

Additionally relevant prior art is disclosed in U.S. Pat. No. 5,013,377 that discloses a hand held spacer applicator device. The device is adapted to move on a support table and to generally remain in an upright position but the proper application of the sealant strip requires skill and attention. U.S. Pat. No. 5,246,331 discloses an air flotation assembly table that allows a sheet of glass to be conveniently moved and aligned toward a front working area. However, the application of the spacer, or strip, along the edges of a sheet of glass still requires skill and attention for the strip be properly positioned and aligned. If not done properly, the strip might be positioned inwardly from the edge in some locations and would be unacceptable if it appears uneven at the edge of the framing material after assembly. There is particularly concern during the application of the strip at the corners to insure that the strip is applied at a tight right angle. If not, the strip will be clearly seen after assembly.

U.S. Pat. No. 5,433,818 discloses apparatus for turning a glass work piece and for applying a sealing strip continuously along its edges. The apparatus includes an air flotation support bed covered by an air-permeable mat, a sealing strip applicator in a carriage, suction cup assemblies mounted for movement on respective mutually perpendicular slides for gripping the sheet at two adjacent corners thereof. The movement of the assemblies is coordinated such that, while gripping the sheet, one assembly is moved towards the initial position of the other assembly and simultaneously the latter is moved towards the corner diagonally opposite that at which the first assembly was initially disposed.

In addition, 3M is the assignee of U.S. Pat. No. 6,846,378 entitled "Tape applicator and methods of applying tape to a surface" which also relates to U.S. Pat. Nos. 6,793,758, 6,634,401 and 6,571,849. Cardinal is the assignee of U.S. Pat. No. 6,793,971 entitled "Methods and devices for manufacturing insulating glass units." EdgeSeal is the assignee of U.S. Pat. No. 6,068,720 entitled "Method of manufacturing insulating glass units."

Lafond is the assignee of U.S. Pat. No. 6,378,586 (entitled "Apparatus for automated application of spacer material for window assembly"); U.S. Pat. No. 6,329,030 (entitled "Composite insulated glass assembly and method of forming same"); U.S. Pat. No. 6,279,292 (entitled "Insulated glass window spacer and method for making window spacer"); U.S. Pat. No. 6,148,890 (entitled "Apparatus for the automated application of spacer material and method of using same"); U.S. Pat. No. 5,975,181 (entitled "Strip applying hand tool with corner forming apparatus"); and U.S. Pat. No. 5,888,341 (entitled "Apparatus for the automated application of spacer material"). Lenhardt is the assignee of U.S. Pat. No. 6,609,611 entitled "Device for conveying insulating glass panes"; U.S. Pat. No. 5,319,186 entitled "Apparatus for controlling the movement of a tool along the edge of glass panes"; and U.S. Pat. No. 4,561,929 entitled "Apparatus for applying an adhesive strip of plastic to a glass pane".

Lisec is the assignee of U.S. Pat. No. 4,434,024 entitled "Device for assembling insulating glass panes"; U.S. Pat. No. 5,823,732 entitled "Device for moving insulating glass panes"; U.S. Pat. No. 5,394,725 entitled "Apparatus for the production of spacer frames for insulating glass panes from hollow profile strips"; a U.S. Pat. No. 5,173,148 entitled "Installation for the production of insulating glass"; U.S. Pat. No. 4,961,816 entitled "Apparatus for emplacing spacers"; U.S. Pat. No. 4,961,270 entitled "Apparatus for determining the spacing between glass sheets of insulating glass panes"; U.S. Pat. No. 4,885,926 entitled "Apparatus for the production of spacer frames"; U.S. Pat. No. 4,769,105 entitled "Device for the mounting of flexible spacers"; and U.S. Pat. No. 4,743,336 entitled "Device for mounting flexible spacers on glass sheets."

Lockformer Company is the assignee of U.S. Pat. No. 6,038,825 entitled "Insulated glass window spacer and method for making window spacer." Manser is the assignee of U.S. Pat. No. 5,932,062 entitled "Automated sealant applicator." PPG is the assignee of U.S. Pat. No. 6,470,561 entitled "Spacer and spacer frame for an insulating glazing unit and method of making same" {which also relates to U.S. Pat. Nos. 5,501,013 and 5,351,451}; and U.S. Pat. No. 6,223,414 entitled "Method of making an insulating unit having a low thermal conducting spacer."

Tremco is the assignee of U.S. Pat. No. RE35,291 entitled "Apparatus for laying strip on glass or like material"; U.S. Pat. No. 5,045,146 entitled "Tape applicator with corner forming device"; and U.S. Pat. No. 5,013,377 entitled "Apparatus for laying strip on glass or like material." Weather Shield Mfg is the assignee of U.S. Pat. No. 5,640,828 entitled "Spacer for an insulated window panel assembly."

The aforementioned patents are incorporated herein by reference and disclose the details of IG fabrication, sealant and spacer construction, sealant application head construction. There remains a need for an automated, horizontal spacer and/or sealant applicator for IG fabrication of minimal complexity.

SUMMARY OF THE INVENTION

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The various embodiments and examples of the present invention as presented herein are understood to be illustrative of the present invention and no restrictive thereof and are non-limiting with respect to the scope of the invention.

The present invention provides a dual head horizontal automatic flexible spacer and/or sealant applicator for a glass work piece that applies the flexible spacer and/or sealant along a single axis and will operate on a range of work pieces sizes. The invention will automatically square a work piece and pivot about a virtual pivot point of a corner of the work piece for any of a range of work piece sizes. A method of applying spacer and/or sealant is disclosed. These and other advantages of the present invention will be clarified in the description of the preferred embodiments taken together with the attached figures.

DESCRIPTION OF THE PREFERRED EMBODIMENTS

Figure 1:
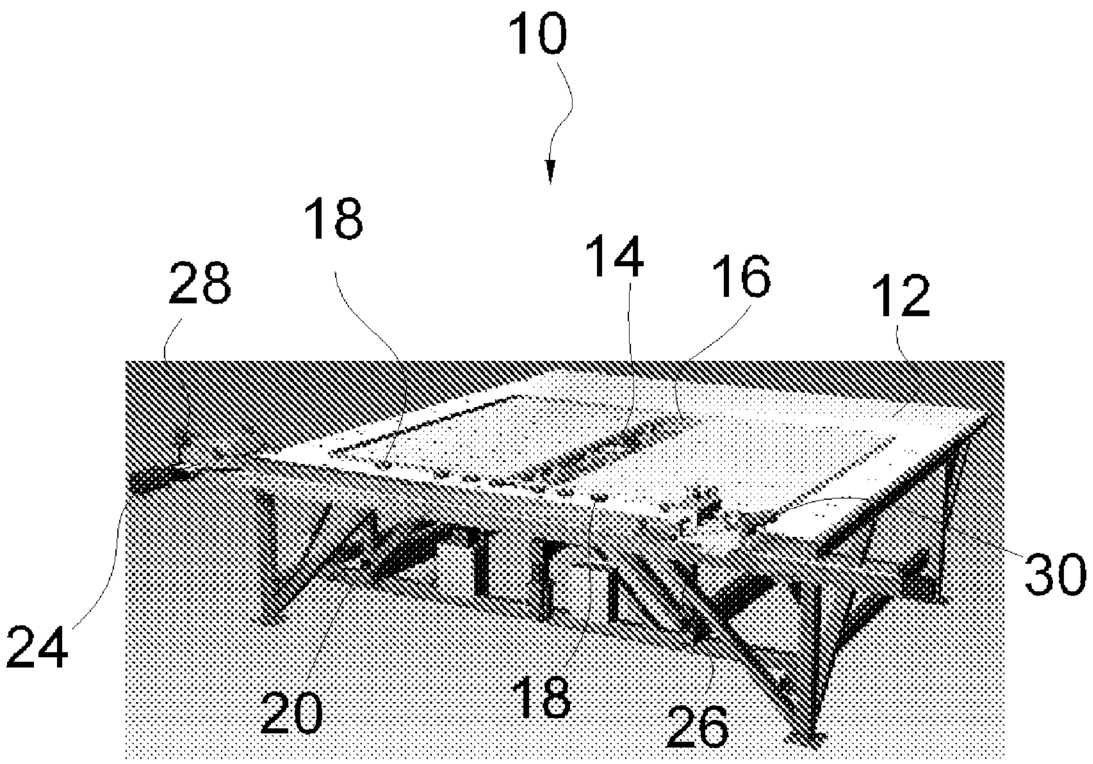
FIG. 1 is a perspective view of a dual head horizontal automatic flexible spacer and/or sealant applicator for a glass work piece that applies the flexible spacer and/or sealant along a single axis according to one embodiment of the present invention.

FIG. 1 is a perspective view of a dual head horizontal automatic flexible spacer and/or sealant applicator 10 for a glass work piece that applies the flexible spacer and/or sealant (not shown) along a single axis according to one embodiment of the present invention. The applicator 10 includes a horizontal work piece supporting table 12, such an air float table as well known in the art. "Horizontal" generally is +/− five degrees from horizontal, whereby the work piece is effectively laying on the table 12 (as opposed to on separate structures in vertical configurations).

The table 12 includes a motor controlled rotating work piece support 14. The support is also configured for axial movement along a track defined by slot 16 in the table 12. The precise rotation of the support 14, and movement of the support 14 along the slot 16 (more precisely the track below the slot 16) is controlled and coordinated through a central controller generally shown at 40 in FIG. 2, and such controllers and motors are available through Trio Motion Controllers.

The table 10 includes squaring stops 18 aligned parallel to the application axis for the applicator 10. A linear track 20 is adjacent the table 12 and aligned parallel along the application axis for the table. Although not required, the application axis is generally perpendicular to the slot direction 16 (yet other relative angles could be provided if desired. A driven carriage 22 is moveable along the track 20 through conventional controllers and motors such as are available through Trio Motion Controllers. First and second application heads 24 and 26 are also moveable along the track 20. The carriage 22 is selectively coupled to and decoupled from the first application head 24 and a second application head 26 on opposed sides of the carriage 22. The coupling can be through electro magnetic plates on each side of the driven carriage 22 that selectively engage with and connect to adjacent heads 24 and 26 when powered and can be easily decoupled through a turning off of the coupling electromagnet on the given side. The heads 24 and 26 are passively driven through the carriage 22, when coupled thereto. As shown in the figures, the heads 24 and 26 have docking positions out of the way of the relevant active range of the alternative captured head 24 or 26. There may be an application in which both heads 24 and 26 are simultaneously coupled to the driven carriage, but generally only one head 24 or 26 will be engaged and in use in the applicator 10.

The construction of the heads 24 and 26 is not shown in detail, but will be generally known to those of skill in the art and can vary depending upon what specific spacer is being applied by the respective head 24 and 26. It is contemplated that the heads 24 and 26 will accommodate thicker (and higher) spacers of the same type and will require adjustments therein. Changes in widths of spacers can be accommodated through manually or automatically adjusting side plates (not shown in detail). The height adjustment would require a similar adjustment in a dimension generally perpendicular to the axis of the slot 16 and the track 20 (the "Z" axis). FIG. 1 discloses an actuator 28 and 30 on each respective head 24 and 26 for automating this adjustment if desired. One design aspect of the present invention is that this z-axis actuator is not aligned perpendicular to the slot 16 and the track 20 but is angled thereto. This angling of the actuator 28 and 30 will greatly reduce the moment of the associated moving head 24 or 26. The actuators 28 and 30 are angled to be less than 45 degrees from the track 20, preferably 5 to 25 degrees from the track 20 and most preferably 5 to 15 degrees from the track 20. It is understood that the angle configuration results in a greater required motion to obtain the desired distance change, but it is expected that the total distance change between the heights of different spacers is minimal and the increased stroke of the actuators is balanced by the decrease in moment.

Figure 2:
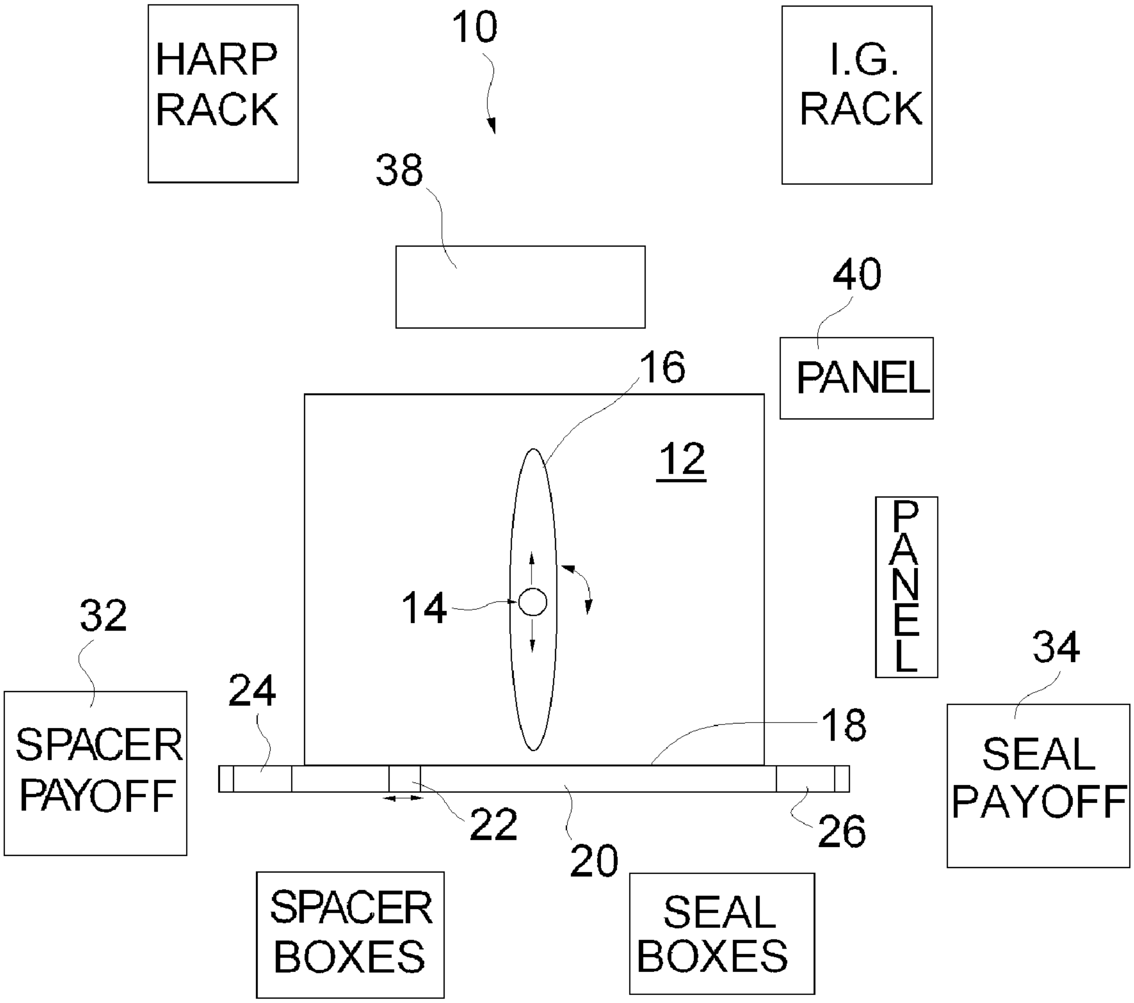
FIG. 2 is a schematic plan view of a stand alone layout for the dual head horizontal automatic flexible spacer and/or sealant applicator for a glass work piece of FIG. 1.

FIG. 2 is a schematic plan view of a stand alone layout for the dual head horizontal automatic flexible spacer and/or sealant applicator 10 illustrating the operator position 38 next to the panel or controller 40 as well as the spacer payoffs 32 and 34. In the stand alone configuration the operator is positioned away from the application axis for added safety. Further the payoffs 32 and 34 are easily accessible to the operators for quick roll change out. In FIG. 2, the one reel or roll payoff 32 is illustrated for one type of spacer, such as the SuperSpacer™ type spacer, while the other is listed for the Truseal™ type spacer. The duel head design does allow for two distinct heads 24 and 26 for two distinct spacers to be simultaneously on the machine allowing for essentially instantaneous switching between the specific spacer for a greater range of product mixing. It is anticipated that both heads 24 and 26 may be for the same type spacer such that one roll can be replaced as the other is operating to allow for continuous operation. The payoff mechanism is not shown in detail and will be understood by those of ordinary skill in the art, however the single axis application of the present design keeps the amount of spacer that is off of the reel to a minimum which will reduce waste (yet the spacer payoff reels are still easily accessible to the operator).

Figure 3A:
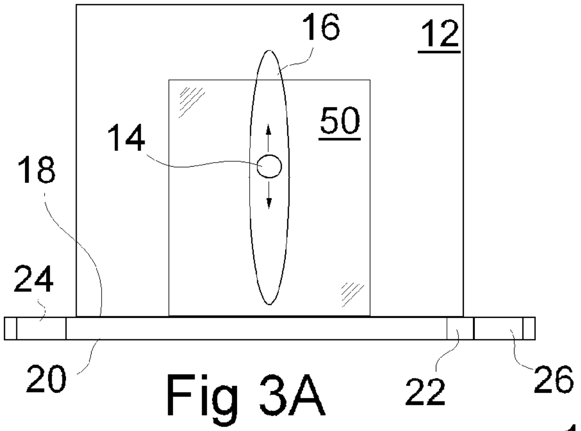
FIGS. 3A-F are schematic sequential views of the sealant application dual head horizontal automatic flexible spacer and/or sealant applicator for a glass work piece of FIG. 1.
Figure 3B:
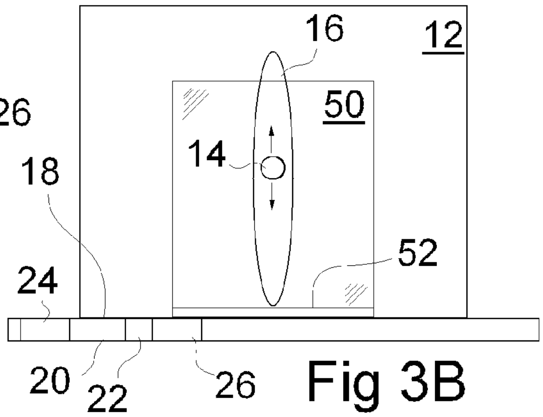
Figure 3C:
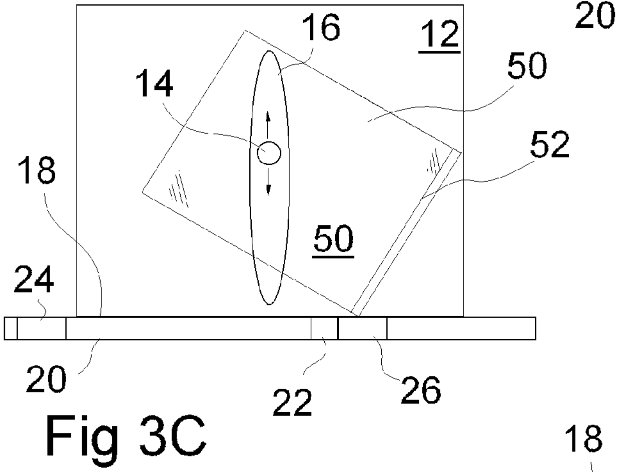

The automatic operation of the applicator 10 of the present invention is best explained in going through FIGS. 3A-3F. The first step in the process is to load the work piece 50 onto the table 12. In the stand alone version the manual loading side is located opposite of application side for safety. In automated, in line versions the loading side can be any of the three open sides. The loading stops can aid in glass work piece 50 loading, and initially the work piece 50 need not be loaded exactly square to the stops 18. The next step is to shuttle work piece 50 to squaring stops 18. An edge detecting sensor (not numbered in the figures) can measure the front edge of the work piece 50 and be used to roughly center the support 14, also called a cup, along the slot 16 dimension, as the controller will have information on the expected length of the desired work piece currently on the table. The edge detecting sensor can be attached to the table at the lead end of the slot or may be attached to the support 14, as both will be traversed by the work piece. The rotation axis or drive of the support 14 is disabled for the squaring function, also called cog free rotation of the support. Now the support can move the work piece into the stops 18 to square up the work piece 50. This is the start of the spacer application process shown in FIG. 3*a*. The engaged head 24 or 26 (26 in the drawings) is moved along the track 20 by driven carriage 22. A sensor on the head 24 or 26 will sense the leading edge of the work piece 50 and allow the head 26 (or 24) to begin applying the spacer at the desired location. The sensor will detect the trailing edge of the work piece 50 as the head 26 completes one side of the work piece as shown in FIG. 3B. The construction and operation of the edge diction sensors on the table and in the heads will be well known to those in the glass work piece processing art and are not discussed further here.

Figure 3D:
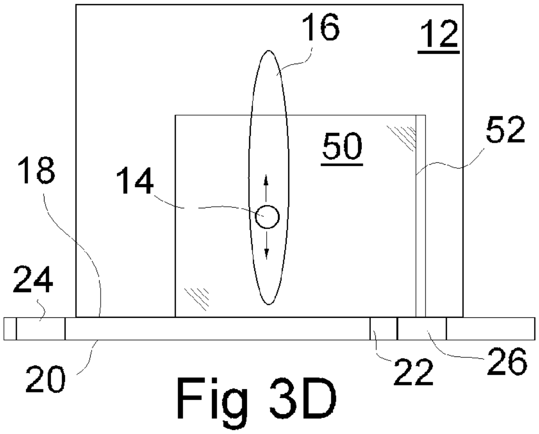
Figure 3E:
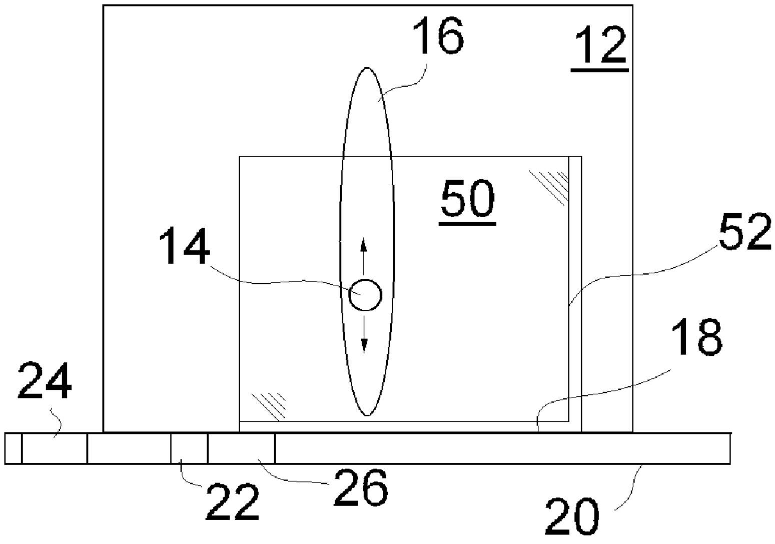
Figure 3F:
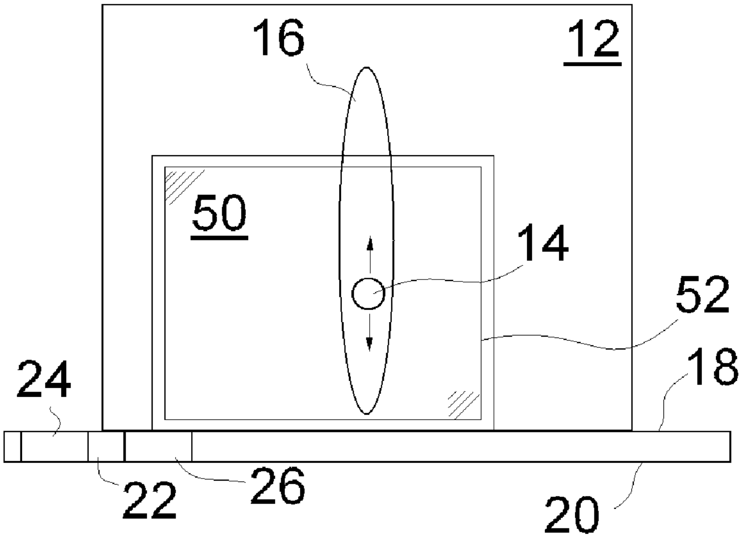

With the trailing edge detected, the applicator 10 will rotate the support 14, and move support 14 along the slot 16 and move the head 26 (or 24) whereby there is a virtual pivot point at the sensed corner of the work piece 50 relative to the head 26. In other words, relative to the head 26 the work piece 50 is pivoted about the corner. The device 10 effectively measures the glass work piece 50 on the fly and allows the device to be used for any size glass that can fit on the table 12 (and rotated without moving off of the table 12). The completion of one turn or 90 degree rotation is shown in FIG. 3D, and the head can apply the spacer along the second side as shown in FIG. 3E. The pivoting is repeated for at least the other two corners until the entire work piece 50 is supplied with spacer 52 as shown in FIG. 3F. The spacer 52 can be automatically cut by the head 26 (or 24). A corner tape applicator can be used, if desired, on the head 26 (or 24) following the severing of the spacer, which tape applicator could pivot at the corner on the last corner that is to be sealed with the tape (the other three corners being contiguous spacer material). The fourth pivoting motion can be eliminated if the corner tape is not applied, thereby speeding up the throughput. However a forth pivot may be advantageous in that the work piece 50 would exit the table 12 in the same orientation as it was loaded if four turns are utilized, which can be advantageous for automated lines.

The process was described with spacer applications, however the process is not significantly different if the heads are applying sealant (generally applied after the spacer is in place in the IG fabrication). The heads 24 and 26 would simply be designed for sealant application and the payoffs 32 and 34 would be a sealant source. The single axis application allows the feed from the payoffs 32 and 34 to be minor matters for sealant delivery.

The simple design of the current invention allows for easy additions thereto. For example, spacer marking or muntin marks can easily be incorporated, as desired. The ability to mark the spacer material (ink jet or laser) with product codes, manufacture information, etc in a repeatable and programmable location can be advantageous. Further the single axis application simplifies the incorporation of machine vision quality control. The single axis application allows newly designed flexible spacers to be easily incorporated in as there is no complicated payoff or other feeding criteria and the heads 24 and 26 are easily accessible for adjustment or outright replacement).

The present invention offers a wide variety of configurations in a single device, for example a Stand-Alone, Single Head (eliminate one head 24 or 26 and the associated payoff structure), 84" Table which is ideal for small shops currently having with manual tables. A second related configuration is a Stand-Alone, Dual Head, 84" Table in which the Dual Heads 24 and 26 are configured for 2 different spacers, which would be ideal for medium shops using, for example, both Edgetech™ and TruSeal spacers. Then consider that the same 120" model can easily accommodate an In-Line, Single Head, 120" Table that is ideal for entry level line configurations; and alternatively a Stand-Alone, Dual Head, 120" Table wherein the Dual Heads 24 and 26 are configured for identical spacers which is ideal for large shops with high volume requirements.

The present design allows for "lazy loading" as described above to simplify the loading process (the device can automatically square a loaded part). The device requires no part information in advance and works even if the part is loaded off-center. The rotation profile is generated real-time for each and every part.

The system has been designed with both in-line and stand-alone operation in mind, as discussed above. This level of flexibility can offer the customer a migration path to a fully automated plant, with a minimal initial investment and re-use of the same automation platform.

Safety features such as fully contained guarding for the part in process, part braking in the event of loss of suction and safety mats for motion hold to allow for safe entry into the machine (without scraping or resetting the machine) are also in the machine.

The system has been designed for less maintenance and more uptime. Examples of this include the use of a servo driven axis for all motors, including the conveyer and the use of a high-torque direct drive motor for the rotation of the glass.

The invention features an adaptive learning mode, wherein the equipment can be programmed to run only as fast as needed to pace the rest of the line. Running the equipment at full speed, only to have the machine sitting idle, creates unnecessary wear on cables, bearings and other mechanical components.

Proactive machine communication can be provided with the use of LED display boards and light posts visible from 120 ft, to allow the unattended equipment to signal operators with machine information before the machine requires attention. The expandable LED system can place up to 8 units on the network, allowing for display throughout the entire plant and office space.

A dual application head option allows for the application of 2 different spacers, as noted above. The 2 spacers can be the same to eliminate down-time during spool change or differ either in simply the thickness or spacer type (e.g. Super-Spacer™ and TruSeal™ spacers). A head design for a given family of spacers will support any spacer thickness within the family. The heads are interchangeable to allow the machine to easily convert from one spacer to the next, if a distinct head is required.

The system can be programmed with part information either at the local machine or over a LAN. The size of the glass being feed into the machine can be automatically calculated. The fully automatic glass thickness measuring features allow for continuously variable glass to be feed into the machine with zero change over time. The machine can adjust from single strength to support up to 1.00" thick triples units on the fly, with no operator intervention. The invention support for a wide range of glass sizes (e.g., 14"×14"–72"×96") and thicknesses (e.g., single strength—1.0" triples) is made possible by a generous 10" diameter vacuum cup for support 14 to secure the part and servo loop gain scheduling. Finally, spacer application along a fixed axis insures consistent, straight spacer application.

Whereas particular embodiments of this invention have been described above for purposes of illustration, it will be evident to those skilled in the art that numerous variations of the details of the present invention may be made without departing from the invention.

What is claimed is:

1. An automatic applicator for applying product to glass work pieces along a single application axis, the applicator comprising:

a work piece supporting table;

a rotating work piece support coupled to the table and configured for axial movement relative to the table;

motors coupled to the rotating work piece support for controlling rotation thereof and axial movement of the rotating work piece support relative to the table;

a central controller coupled to the motors for coordinating the movements of the rotating work piece support; and at least two application heads, each head for supplying the product to glass work pieces along the single application axis; and a linear track adjacent the table and aligned substantially parallel along the application axis for the table, wherein each head is configured to move along the linear track a driven carriage moveable along the linear track, wherein the carriage is selectively coupled to and decoupled from each application head.

2. The automatic applicator of claim 1 wherein the table includes a slot therein defining the axial movement of the rotating work piece support, and wherein the slot is generally perpendicular to the application axis of the table.

3. The automatic applicator of claim 1 wherein the table includes squaring stops aligned parallel to the application axis for the applicator.

4. The automatic applicator of claim 1 wherein each head includes a height adjustment to accommodate products of different heights.

5. The automatic applicator of claim 4 wherein each height adjustment is movable along an adjustment axis that is not perpendicular to the single application axis.

6. The automatic applicator of claim 1 wherein the central controller includes a control panel that defines an operator station and wherein the operator station is spaced from the application axis.

7. The automatic applicator of claim 1 wherein each application head is configured to apply a distinct product.

8. The automatic applicator of claim 1 wherein each application head is configured to supply one of a spacer and a sealant.

9. The automatic applicator of claim 1 further including edge detection sensors coupled to the table configured to measure an edge of the work piece.

10. The automatic applicator of claim 1 further including edge detectors on each application head configured to measure an edge of the work piece.

* * * * *